United States Patent [19]

Hüe et al.

[11] 4,276,327

[45] Jun. 30, 1981

[54] PROCESS FOR DEPOSITING ALUMINA ONTO A SUBSTRATE AND ALUMINA REGENERATION

[75] Inventors: Bernard P. H. Hüe; Henri A. Mercier, both of Gardanne, France

[73] Assignee: Pechiney Ugine Kuhlmann, Paris, France

[21] Appl. No.: 744,820

[22] Filed: Nov. 24, 1976

[30] Foreign Application Priority Data

Dec. 15, 1975 [FR] France ............................. 75 39408

[51] Int. Cl.³ .......................................... B05D 1/40
[52] U.S. Cl. .................................. 427/345; 427/380; 427/435; 427/372.2
[58] Field of Search ............. 427/345, 372 R, 380, 427/435; 23/288 F; 423/212; 252/463, 437

[56] References Cited

U.S. PATENT DOCUMENTS

| | | | |
|---|---|---|---|
| 2,791,516 | 5/1957 | Chambers et al. | 427/345 |
| 2,941,902 | 6/1960 | Talmey et al. | 427/345 |
| 3,025,188 | 3/1962 | Larch et al. | 427/345 |
| 3,227,659 | 1/1966 | Brandenburg et al. | 252/437 |
| 3,231,520 | 1/1966 | Leak et al. | 252/463 |
| 3,362,783 | 1/1968 | Leak | 423/212 |

*Primary Examiner*—Ronald H. Smith
*Assistant Examiner*—Janyce A. Bell
*Attorney, Agent, or Firm*—Dennison, Meserole, Pollack & Scheiner

[57] ABSTRACT

A process for the concurrent deposition and regeneration of alumina onto a substrate from an aqueous sodium aluminate solution comprising immersing the substrate in an aqueous sodium aluminate solution of which the composition is controlled and adjusted by passage through a regeneration circuit where alumina is added to make up for the quantity deposited. The invention may be used in the production of adsorbents for the lead present in the exhaust gases of internal combustion engines.

6 Claims, 1 Drawing Figure

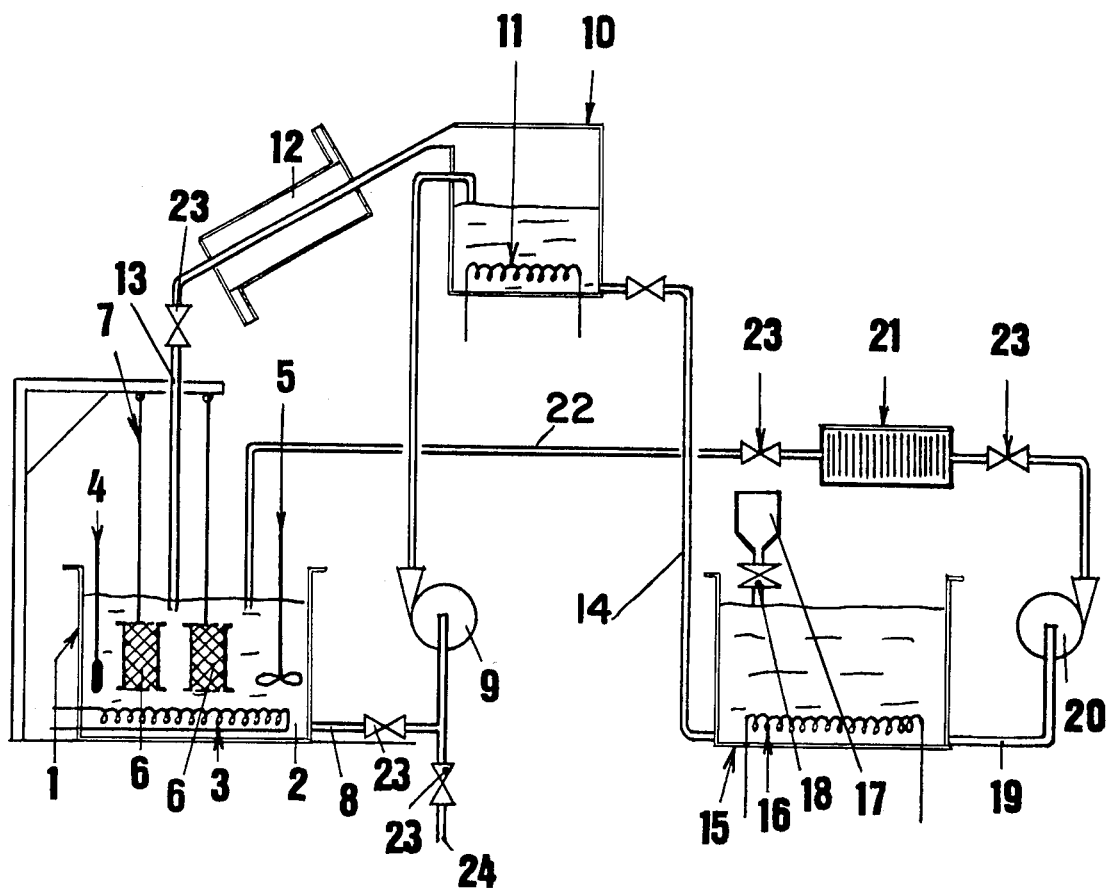

PROCESS FOR DEPOSITING ALUMINA ONTO A SUBSTRATE AND ALUMINA REGENERATION

This invention relates to an improvement in processes for depositing alumina onto a substrate and regeneration thereof from an aqueous alkali aluminate solution, and more especially in deposits of alumina whose adsorbent properties it is desired to utilize, in particular, when the deposits are formed on a substrate having a large surface.

It is known that, under certain conditions, aqueous alkali aluminate solutions decompose into alumina which precipitates in the form of its trihydrate $Al_2O_3.3H_2O$, and alkali hydroxide either spontaneously or by the addition of seeds which serve to initiate the decomposition reaction. These reactions are used, for example, in the Bayer process by which it is possible to obtain from bauxite pure alumina intended for the production of aluminum by igneous electrolysis.

It is also known that certain physical forms of alumina have catalytic and adsorbent properties which are used in numerous industrial applications.

More recently, as a result of work carried out with a view to reducing the level of pollution by the exhaust gases from combustion engines, it has been found that certain forms of alumina are able not only to perform a catalytic function, but also to adsorb most of the lead entrained in the form of volatile compounds in exhaust gases, the lead emanating from the decomposition, in the combustion chambers of the engine of the tetraalkyl lead derivatives added to the fuel to improve its "octane number", i.e., its resistance to self-detonation.

Among the various constituents of exhaust gases (such as oxides of nitrogen, carbon monoxide and dioxide), lead is one of the most harmful on account of its noxious physiological effects upon animal and even vegetable organisms. Despite intensive research efforts, it has not yet proved possible to find an antidetonant with an effectiveness comparable with that of lead tetraalkyls, and the only solution to the problem of lead pollution is either to reduce the lead tetraalkyl content of the fuels, which currently corresponds to between about 0.40 and 0.45 g of lead per liter which would force manufacturers to modify engines by reducing the compression ratio and hence efficiency with a corresponding increase in fuel consumption, or to retain the lead in the expansion and exhaust circuit of the combustion gases so that it no longer escapes into the atmosphere.

By virtue of its well known adsorbent properties, alumina in certain physical forms corresponding to a large specific surface is particularly suitable for adsorbing the lead present in exhaust gases.

It has been found (cf. U.S. Pat. Nos. 3,227,659; 3,231,520; 3,495,950 and 3,362,783 in the name of Texaco Inc.) that the catalytic and adsorbent properties of alumina were particularly effective when it was deposited onto a metallic substrate in the form of a tangle of fine wires, such as "metal wool" or "metal fiber", the texture of this tangle being such that it offers only a weak resistance to the passage of the exhaust gases and does not reduce the performance of the engine to any significant extent.

The process described in these patents essentially comprises contacting the metal wool with an aqueous solution of an alkali metal aluminate for a sufficiently long period, on the order of 1 to 20 hours, at a temperature at least equal to the ambient temperature, the alumina concentration of the solution being readjusted by the addition of aluminum metal. The excess of sodium hydroxide contained in the alkali aluminate solution attacks the aluminum which is converted into aluminate, thus compensating the quantity of alumina which is deposited onto the metal wool.

This process provides an effective catalyst, but unfortunately is attended by three serious disadvantages:

1. It uses a high-purity aluminum which loads the cost price because aluminum of commercial purity (so-called "A4" quality, containing 99.0% of Al, or "A5" quality containing 99.5% of Al) gives rise to an extremely violent attack by the sodium hydroxide solution due to the presence of impurities (notably Fe and Si) which makes this operation very difficult to control. Only 99.99% pure aluminum lends itself to more calm and progressive attack;

2. Reaction of the aluminum with the alkaline aluminate liquor is accompanied by the evolution of hydrogen with the dangers of explosion which this involves and as a result of this evolution by the formation in large quantities of a vesicular mist of sodium hydroxide solution which is extremely irritating to the respiratory tracts and harmful to the environment;

3. The random nature of the attack of the aluminate liquor on the aluminum, whose velocity it is not possible even remotely to control, makes it impossible to use a continuous process with circulation and regeneration of the aluminate liquor which would enable the aluminum concentration of the liquor to be known at any moment and to be corrected as it diminished on account of the deposition of alumina onto the metallic substrate.

The present invention obviates these three disadvantages and in addition, provides a highly effective adsorbent with all the qualities required to perform its function in adsorbing the lead present in the exhaust gases of motor vehicles and combustion engines in general, whether stationary or mobile.

The invention enables an adherent deposit of alumina on a substrate to be obtained from an aqueous alkali aluminate solution of which the composition is readjusted as its alumina content diminishes on account of deposition. It is distinguished by the fact that the substrate is immersed in a container through which circulates an aqueous alkali aluminate solution of which the composition is controlled and adjusted during deposition by passage through a regeneration circuit in which the solution of reduced alumina content issuing from the container where deposition is carried out is concentrated by evaporation, regenerated by the addition of alumina, filtered, returned to the container where deposition is carried out and has added to it a quantity of water substantially equivalent to that which has been evaporated.

The invention is illustrated by the accompanying drawing and the following Example.

FIG. 1 shows one possible, but by no means compulsory, arrangement of the deposition, concentration and regeneration containers and of the auxiliary equipment, including pipes.

The principal container 1 which is made of a material resistant to alkaline solution, such as iron or iron-based alloys, contains the alkali aluminate solution 2 from which the alumina is deposited by the following decomposition reaction: $2AlO_2Me + 4H_2O \rightarrow Al_2O_3.3H_2O + 2MeOH$, where Me represents an alkali metal selected from Na, K or Li. In practice, sodium aluminate is mainly used. The alumina is deposited in the form of its trihydrate $Al_2O_3.3H_2O$. The temperature of the aluminate solution is kept constant by means of the heating device 3 and the thermostat 4. The temperature is generally situated in the range from 80° to 100° C.

An agitator 5 enables the homogeneity of the aluminate solution 2 contained in the tank 1 to be maintained.

The substrate 6 onto which the alumina is to be deposited is immersed in the aluminate solution 2. It is supported for example by the suspension means 7. It may also be supported by agitation or rotation means (not shown).

The aluminate solution 2 flows through the outlet pipe 8 and the pump 9 into an evaporator 10 heated in known manner by the device 11. The water evaporated is condensed in the coolant 12. It may be returned to the principal container 1 through the pipe 13. The concentrated aluminate solution is then introduced through the pipe 14 into the container 15 heated by the known device 16 where alumina is added, for example, by means of the hopper 17 and the measuring distributor 18.

The aluminate solution has to be concentrated before the alumina is added if dissolution and conversion into aluminate are to take place rapidly and completely. The alumina is generally added in the form of its trihydrate, $Al_2O_3.3H_2O$. The aluminate solution thus concentrated and regenerated then flows through the pipe 19 and the pump 20 is filtered in the filter 21 to prevent any deposits of impurities, such as hydroxides of iron or insoluble products, and is then returned through the pipe 22 to the principal container 1.

In addition, this apparatus comprises in known manner a certain number of isolation valves 23 which enable the various cleaning and maintenance operations to be carried out, and an outlet 24 through which the aluminate liquor issuing from the main container 1 may be run off in order to verify its composition and to calculate the quantity of alumina to be added to 15 which may be ascertained manually or automatically in known manner.

In the container 1, the deposition of alumina onto the substrates 6 is relatively slow and lasts from 5 hours to 40 hours and, in practice, from 15 to 24 hours. Deposition takes place not only on the substrate, but also on the walls of the container. In order to obviate this disadvantage, the containers 1 and 15 may be identical in shape and size and may periodically be interchanged. In this way, when the container 1 replaces the container 15, the alumina deposited onto the walls redissolves and is thus recovered and recirculated. Instead of interchanging the containers 1 and 15, it may be sufficient to interchange their functions by a suitable arrangement of the pipes, valves and pumps.

The process according to the invention lends itself to numerous modifications. In particular, the substrate, which is generally metal wool and in particular stainless steel wool, may initially be coated with alumina and then introduced into the mufflers. However, it is also possible and preferable initially to introduce the metal wool into the mufflers ensuring that it is homogeneously arranged and then to introduce the mufflers into the container 1. In this case, the alumina is deposited not only onto the metal wool, but also onto the inner and outer walls of the silencer, which does not have any disadvantages.

EXAMPLE

Mufflers intended for motor cars having a diameter of 105 mm and a length of 315 mm were filled with approximately 300 g of metal wool of ferritic stainless steel containing 15% of chromium, of which the individual filaments had an approximate cross-section of 0.1×0.4 mm. The mufflers were provided at their ends with wide-mesh expanded metal to retain the metal wool. They were then introduced into the container 1 which contained a sodium aluminate solution containing 62 g of $Na_2O$ per liter (i.e. equivalent to 80 g of NaOH) and approximately 96 g of $Al_2O_3$, i.e. a ratio by weight of $Al_2O_3$ to $Na_2O$ of approximately 1.20. This solution had been obtained by diluting a concentrated solution of 275 g of $Na_2O$ and 330 g of $Al_2O_3$ per liter which acts as reserve solution because it is relatively stable as a function of time.

The dilute solution was kept at a temperature of 88°±2° C.

The deposition of alumina began spontaneously after about 5 hours and was left to continue for 24 hours.

Throughout this period, the agitator 5 maintained the homogeneity of the aluminate solution in the container 1. In addition, the solution was circulated through the regeneration unit. The solution issuing from the container 1 still contained 62 g of $Na_2O$ per liter, although the ratio by weight of $Al_2O_3$ to $Na_2O$ had fallen from 1.20 to approximately 1.12 on account of the deposition of alumina onto the metal wool. The solution was then concentrated in the evaporator 10 so as to bring its $Na_2O$ content to 280-290 g per liter, after which it was heated close to its boiling point and received the quantity of alumina, in the form of its trihydrate $Al_2O_3.3H_2O$, required to restore the ratio by weight to 1.20. The solution thus regenerated was filtered to eliminate any decomposition seeds from the aluminate liquor and to retain the ferric residues, and was then reintroduced into the container 1 with the quantity of water necessary for keeping the concentration of the solution 2 constant at 62 g of $Na_2O$ per liter.

After 24 hours, the mufflers were withdrawn from the tank 1, thoroughly rinsed and dried. The quantity of alumina deposited onto each muffler amounted to approximately 900 g of alumina trihydrate, corresponding to approximately 600 g of anhydrous alumina. The thickness of the alumina deposit on each filament of the steel wool was of the order of a few tenths of a millimeter.

The alumina was then activated under calcining conditions by progressively increasing the temperature to 530°-550° C. in order completely to dissociate the trihydrate and to obtain anhydrous alumina adhering perfectly to the metallic substrate.

Two mufflers obtained by this process were installed in series in the exhaust system of a motor car with a 1600 cc engine. After 30,000 km, in the course of which 3200 liters of petrol containing 0.45 g of lead per liter were consumed, 1300 g of lead were found in the filter, corresponding to a lead recovery level of 90%.

For an identical vehicle equipped with a conventional exhaust system, 400 g of lead were recovered in the form of deposits on the inner walls of the exhaust pipe, corresponding to a retention level of only 28%.

Other modifications and variations of the invention as set forth may be made without departing from the spirit and scope thereof, and therefore, only such limitations should be imposed as are indicated in the appended claims.

We claim:

1. A process of concurrently depositing and regenerating alumina for physical deposition on a metal substrate consisting essentially of immersing the substrate in a circulating aqueous bath solution of alkali metal aluminate containing about 62 g of $Na_2O$ per liter and approximately 96 g of $Al_2O_3$ per liter; agitating and heating the bath to a temperature of 80° to 100° C., the agitation insuring homogeneity of the bath; maintaining the bath rejuvenated by evaporating the aluminate solution to concentrate the same as to bring the $Na_2O$ content to 280–290 g per liter, condensing the evaporated water and returning the water condensate to the aluminate bath, heating the concentrated aluminate solution close to to its boiling point and adding alumina to regenerate the same, filtering the regenerated aluminate solution to remove any deposits of impurities and to eliminate any decomposition seeds from the regenerated aluminate solution, adding water in a quantity substantially equivalent to that which has been evaporated and necessary for keeping the concentration of the aluminate solution at 62 g of $Na_2O$ per liter, and returning the thus regenerated aluminate solution to the original aluminate solution.

2. A process according to claim 1 wherein the alkali metal aluminate is sodium aluminate.

3. A process according to claim 1 wherein the temperature of the bath is from about 88°±2° C.

4. A process according to claim 1 wherein the substrate is maintained in the bath from about 5 to about 40 hours.

5. A process according to claim 1 wherein the substrate is a metal wool of ferritic stainless steel to be utilized as an adsorbent of lead present in the exhaust gases of an internal combustion engine in a clean-air catalyst.

6. A process according to claim 1 wherein said substrate is heated under calcining conditions to a temperature of 530°–550° C. subsequent to removal from the bath to obtain anhydrous alumina.

* * * * *